(12) United States Patent
Lyon

(10) Patent No.: US 11,961,336 B2
(45) Date of Patent: Apr. 16, 2024

(54) DISTRIBUTED LEDGER-BASED VOTING SYSTEM, APPARATUS AND METHOD

(71) Applicant: Dennis Lyon, Oceanside, CA (US)

(72) Inventor: Dennis Lyon, Oceanside, CA (US)

(*) Notice: Subject to any disclaimer, the term of this patent is extended or adjusted under 35 U.S.C. 154(b) by 214 days.

(21) Appl. No.: 17/834,016

(22) Filed: Jun. 7, 2022

(65) Prior Publication Data

US 2023/0096614 A1 Mar. 30, 2023

Related U.S. Application Data

(60) Provisional application No. 63/248,056, filed on Sep. 24, 2021.

(51) Int. Cl.
| | | |
|---|---|---|
| *G07C 13/00* | (2006.01) | |
| *H04L 9/00* | (2022.01) | |
| *H04L 9/32* | (2006.01) | |

(52) U.S. Cl.
CPC ............ *G07C 13/00* (2013.01); *H04L 9/3213* (2013.01); *H04L 9/50* (2022.05); *H04L 2209/463* (2013.01)

(58) Field of Classification Search
CPC ......... G07C 13/00; H04L 9/50; H04L 9/3213; H04L 2209/463
USPC .......................................................... 235/51
See application file for complete search history.

(56) References Cited

U.S. PATENT DOCUMENTS

| | | | |
|---|---|---|---|
| 10,790,964 B2 | 9/2020 | Chopra et al. | |
| 2017/0046689 A1 | 2/2017 | Lobe et al. | |
| 2020/0258338 A1 | 8/2020 | Goswami et al. | |
| 2023/0065435 A1* | 3/2023 | Haney | G06N 3/092 |

OTHER PUBLICATIONS

Aicha Fatrah et. at., Proof of Concept Blockchain-based Voting System, conference paper, Oct. 2019, ACM Digital Library, Tangier-Tetuan, Morocco.

* cited by examiner

*Primary Examiner* — Daniel A Hess
(74) *Attorney, Agent, or Firm* — Thibault Patent Group

(57) ABSTRACT

A distributed ledger-based system, method and apparatus for administering voting contests is disclosed. Potential voters send registration requests to a distributed ledger, and each computing node of the distributed ledger, executing a smart voting contract, registers the potential voters and issues each registered voter a cryptographic voting token. Each registered voter uses the cryptographic voting token to cast an electronic ballot, the electronic ballot comprising a distributed ledger-based voting transaction request. Each voting transaction request is received by each computing node of the distributed ledger and verified, and a distributed ledger-based, verified voting transaction is created and validated along with other verified voting transactions by each of the computing nodes. When the verified voting transactions are validated, a cryptographic block is created and added to a blockchain of the distributed ledger. After a voting contest has conclude, each of the computing nodes validates a final tally of voting tokens received by each candidate in the voting contest, and a final cryptographic block is published by the distributed ledger with the results. This application is related to NFT Origin Ethereum Address 0x7beaD10F8dE9fFd99A0E897840D6105BBBC1184f.

18 Claims, 5 Drawing Sheets

DISTRIBUTED LEDGER-BASED VOTING SYSTEM, APPARATUS AND METHOD

CROSS-REFERENCE TO RELATED APPLICATIONS

This application claims the benefit of U.S. provisional application Ser. No. 63/248,056, filed on Sep. 24, 2021.

BACKGROUND

Field of Use

The present invention relates to distributed ledger technology and more specifically, to a system, method and apparatus for using distributed ledger technology to administrate voting contests. This application is related to NFT Origin Ethereum Address 0x7beaD10F8dE9fFd99A0E897840D6105BBBC1184f.

Description of the Related Art

In recent years, distributed ledger technology, sometimes referred to herein as "blockchain" technology, has exploded onto the scene, promising to provide secure online transactions while eliminating middlemen. The technology draws its power from peers—or nodes—on its network to verify, process, and record all transactions across the system. A distributed ledger is formed as a result of verifications of the transactions by the nodes. This ledger is never stored, but rather exists on the "chain" supported by thousands or millions of nodes simultaneously. Thanks to encryption and decentralization, blockchain's database of transactions is incorruptible, and each record is easily verifiable. The network cannot be taken down or influenced by a single party because it doesn't exist in one place. Well-known Implementations of blockchain technology include Bitcoin and Ethereum. Ethereum is a peer-to-peer system used to keep track of changes to a decentralized database and is particularly suited to executing "smart contracts".

Voting today is typically performed via paper ballots, either in person or via mail, making it inconvenient and susceptible to fraud. It would be desirable to make voting more convenient while at the same time ensuring security, anonymity, and accuracy.

SUMMARY

The present disclosure describes embodiments of a distributed ledger-based voting system, method and apparatus. In one embodiment, a method is described, independently performed by a plurality of computing nodes of a distributed ledger, comprising issuing, by a smart voting contract executed by the plurality of computing nodes of the distributed ledger, a plurality of cryptographic voting tokens to a plurality of voters, respectively, each of the plurality of cryptographic voting tokens for allowing the plurality of voters to cast a single vote in a voting contest, each of the plurality of cryptographic voting tokens comprising a unique identifier, a public digital address associated with the smart voting contract, and a public digital address associated with a particular one of the plurality of voters, respectively, receiving, by the plurality of computing nodes, a plurality of voting transaction requests from the plurality of voters over a wide-area network, each of the plurality of voting transaction requests comprising a selection of one or more candidates associated with the voting contest, an identification of a particular voting token previously issued to each respective voter and associated with the voting contest; and a public digital address associated with a particular voter who submitted a voting transaction request and determining a final result of the voting contest based on the plurality of voting transaction requests received.

In another embodiment, a distributed ledger-based voting system is described, comprising a voting administrator node for generating a smart voting contract, the smart voting contract for administrating a first voting contest, and a distributed ledger, comprising a plurality of computing nodes, each of the computing nodes comprising a processor for executing processor-executable instructions stored in a memory of each of the computing nodes, that causes each of the processors to issue a plurality of cryptographic voting tokens to a plurality of voters, respectively, each of the plurality of cryptographic voting tokens for allowing the plurality of voters to cast a single vote in a first voting contest, each of the plurality of cryptographic voting tokens comprising a unique identifier, a public digital address associated with the smart voting contract, and a public digital address associated with a particular one of the plurality of voters, respectively, receive a plurality of voting transaction requests from the plurality of voters over a wide-area network, each of the plurality of voting transaction requests comprising a selection of one or more candidates associated with the voting contest, an identification of a particular voting token previously issued to each respective voter and associated with the voting contest; and a public digital address associated with a particular voter who submitted a voting transaction request, and determine a final result of the voting contest based on the plurality of voting transaction requests received.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Systems, methods and apparatus are described for using distributed ledger technology to administer voting contests. Such distributed ledger technology may be especially useful for arbitrating voting contests, because it can provide anonymity, eliminate fraud, ensure accurateness and offer accountability. Using such a system, method and apparatus, voters can effectively submit their votes without revealing their identity or political preferences to the public. Officials can count votes with absolute certainty, knowing that each vote can be attributed to only one voter, no fakes can be created, and tampering is nearly impossible. As an additional benefit, the results of voting contests using distributed ledger technology are fully auditable. It should be understood that the terms "distributed ledger" and "blockchain" may be used interchangeably herein.

Embodiments of the present invention improve the functionality of centralized electronic voting systems, due to the decentralized manner in which voting contests are conducted. Using distributed ledger technology, votes are cryptographically protected against viewing by others, cryptographically authenticated to guard against fake votes, and distributed among a plurality of computing nodes so that no single point of failure exists.

Figure 1:
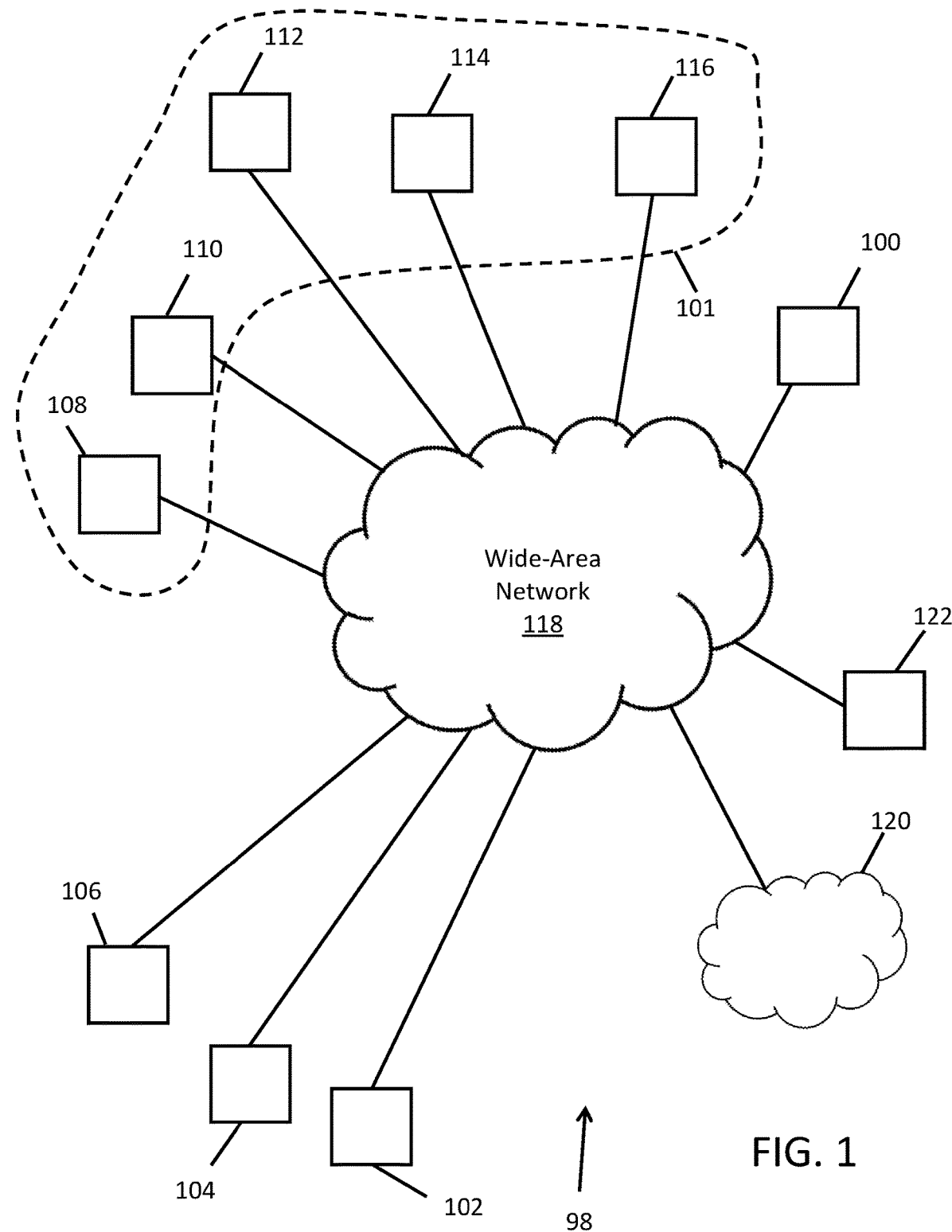
FIG. 1 is a functional block diagram of one embodiment of a distributed ledger-based voting system.

FIG. 1 is a functional block diagram showing one embodiment of a distributed ledger-based voting system 98 in accordance with the inventive concepts described herein. In general, a voting administrator, via administrator computing node 100, generates a smart voting contract for each voting contest that the voting administrator is responsible for. In another embodiment, a single smart voting contract may be created and used to administer two or more voting contests that the voting administrator is responsible for. The smart voting contract(s) is/are distributed to a distributed ledger 101, comprising a plurality of computing nodes 108-116, each of which receives and executes the smart voting contract(s). Although distributed ledger 101 is shown in FIG. 1 as comprising only five computing nodes, in practice, hundreds, thousands or even millions of computing nodes are typically used. Using distributed ledger technology, the system 98 provides transparency, security, accessibility, and audibility to voting contests, which are some of the main problems plaguing current voting methods. Since a distributed ledger, or blockchain, is a permanent record of transactions (votes) that are distributed across distributed ledger 101, every vote can irrefutably be traced back to exactly when and where it happened without revealing voters' identities. In addition, past votes cannot be changed, while the present can't be hacked, because every transaction is typically validated by each computing node in system 98. And any outside or inside attacker must have control of 51% of the nodes to alter any verification process. Even if an attacker was able to achieve that while incorrectly entering user votes with their real IDs under the radar, the blockchain-based voting system described herein may allow voters to verify whether their vote was correctly entered in the system, adding another layer of security and trust.

Each of the blocks 108-116 shown in FIG. 1 represent a computing device or "node" of distributed ledger 101, i.e., a computer, computer server or the like, capable of executing smart voting contracts issued by voting administrator node 100, having network access capability, each of the computing nodes coupled to a wide-area network 118 such as the Internet. Voting administrator node 100 is also a computer, computer server or the like, operated by a person or organization authorized to administer voting contests in one or more particular jurisdictions, operating as an election administrator, with the authority to create one or more smart voting contracts for one or more voting contests within the jurisdictions. For example, voting administrator node 100 may create one or more smart voting contracts comprising a presidential voting contest between 5 candidates, a United States Senator voting contest between 2 candidates, a governor voting contest between 2 or more candidates, local voting contests, i.e., voting contests for local council, judicial officers, superintendents, etc. Other voting contests may comprise a choice between two or more alternative outcomes, such as whether a particular sporting team will win a sports match against another team, a selection among two or more actors nominated for "best picture" award at the Oscars®, or a choice between two or more possible outcomes to any other future event having two or more potential outcomes. Typically, voting administrator node 100 will have the authority to conduct much or all of the voting contests in a particular jurisdiction, such as a United States state, similar to the authority of a secretary of state's office in each state of the United States.

In one embodiment, each computing node 108-116 runs an Ethereum Virtual Machine (EVM), which is a virtual stack embedded within each node, responsible for executing smart voting contract bytecode. Smart voting contracts are typically written in higher level languages, like Solidity, then compiled to EVM bytecode. In this embodiment, each node (i.e., computing nodes 108-116) receives the smart voting contract(s) from voting administrator node 100 and each node executes each contract to process votes once a voting contest begins.

Smart voting contracts may be created by the voting administrator using a programming language such as Solidity, and each smart voting contract comprises a collection of code and data that resides at a specific public address on distributed ledger 101. It's very similar to a class in Object Oriented Programming, where it includes functions and state variables. Distributed ledger 101 may operate using one of several different blockchain-based technologies suitable for executing smart contracts, such as Ethereum, Hyperledger, Solana, etc.

In one embodiment, voting administrator node 100 receives voter registration requests prior to an upcoming voting contest, the registration requests comprising secure voter identification information of voters using a personal communication device such as one of personal communication devices 102, 104, and 106, in this example. The personal communication devices 102, 104 and 106 comprise network-capable computers, smart phones, wearables, etc., each either executing a voting application or accessing a secure voting website online. While only three personal communication devices are shown in FIG. 1, in reality, millions of personal communication devices send respective voter identification information to voting administrator node 100. The voting identification information may comprise a driver's license, social security number, a cryptographic "cryptographic wallet" address (such as an Ethereum wallet address), a "know your customer" (KYC) number, a home address, a phone number, an email address, a photograph, fingerprints, a date of birth, an age, a political party affiliation, a cryptographic Distributed Identifier (DID), and/or other information that uniquely identifies each potential voter and determines whether each potential voter meets voting requirements set by the voting administrator, such as age, residence, party affiliation, etc. Voters may own a cryptographic wallet that stores cryptographic digital assets, such as non-fungible cryptographic "tokens" for purchasing goods or services or cryptographic voting tokens to cast votes, as will be explained later herein.

In another embodiment, each of the computing nodes 108-116 of distributed ledger 101 receive the registration requests, and processes the requests to determine authenticity of each potential voter and whether each potential voter is authorized to cast a vote in an upcoming election. For example, each potential voter's age, residency, party affiliation, etc. may be verified by each of the computing nodes 108-116 via a smart voting contract executed by the computing nodes, previously distributed to the computing nodes, for example, by voting administrator node 100. Throughout the remainder of this disclosure, reference to a "smart voting contract" may mean reference to the computing nodes 108-116, or to a processor within each of the computing nodes, each executing the same smart voting contract.

In either case, whether registrations are processed by the voting administrator or by computing nodes 108-116 executing a smart voting contract, the registration requests are each validated by one of many two-factor authentication methods known in the art. It may also be accomplished using a process similar to the well-known "know your customer" (KYC) verification process used in the financial industry, whereby voter identities are verified based on written details submitted by voters on a form, supplemented by an In Person Verification (IPV) process. In other embodiments, voters are authenticated by using cryptographic signatures using public key cryptography. In any case, once a voter has been authenticated and verified to meet the conditions to participate in a voting contest, a voter may be assigned a unique KYC number and stored in an online database.

In one embodiment, voting administrator node 100 may advertise the existence of one or more upcoming voting contests to the general public using one or more well-known advertising mediums, such as Facebook, email, banner ads, posting on a dedicated, secure voting website, etc. In some embodiments, a voting "app" may be downloaded by voting devices 102-106, and voting administrator node 100 may send upcoming voting contest announcements to potential voters via the app. Such announcements of upcoming voting contests may comprise an incentive to cast a vote. For example, in a voting contest for the United States presidency, voting administrator node 100 may generate and distribute advertisements that promise a digital asset, such as one or more cryptocurrencies, to each voter who casts a vote for president of the United States. Other incentives could also be awarded, such as discount coupons for goods or services. Voting administrator node 100 could offer more, or fewer, incentives to vote, depending on the particular voting contest and/or the particular jurisdiction where the voting contest is held. For example, few people vote for local, judicial candidates. Voting administrator node 100 could offer an incentive of $\frac{1}{100}$ of one bitcoin to participate in such a voting contest, while offering only $\frac{1}{1,000}$ of a bitcoin for voters to participate in a presidential election. Of course, these figures are for illustrative purposes only, and the value of any incentive given is typically a limited amount, especially in situations where large numbers of voters are likely to participate.

Millions of voter registration requests may be received during a registration time period, for example, during a 6 month time period before an election. In one embodiment, for each voter registration request that is validated, i.e., a voter is authenticated and verified to meet the requirements to participate in a voting contest, voting administrator node 100, or smart voting contract executed by computing nodes 108-116, may issue one voting token to each voter for each voting contest from a cryptographic wallet associated with the voting administrator, or the smart voting contract, respectively. A "voting token" is a digital right to vote in a particular voting contest. Voting tokens are typically considered to be structures and data in a smart voting contract on a public blockchain, such as distributed ledger 101. The voting tokens for any particular voting contest are typically created by a corresponding smart voting contract executed on distributed ledger 101, and the voting tokens are distributed to registered voters who can then use them within the confines of the smart voting contract that created them, i.e., to cast votes during an authorized voting time period, such as two weeks before a predetermined election day. The voting administrator typically creates a smart voting contract for each voting contest, and then distributes each smart voting contract to the nodes 108-116 via administrator node 100 for execution. In many embodiments, voting tokens comprise a unique identifier so that they cannot be electronically duplicated or owned by more than one person or entity at a time. The unique identifier may comprise a hash value created using well-known cryptographic, digital currency methods well-known in the art.

In another embodiment, each smart voting contract may generate a predetermined number of voting tokens prior to registration and/or the start of a voting contest. The voting tokens may be issued, initially, to the voting administrator or to the smart voting contract via a cryptographic, cryptographic wallet associated with the voting administrator or the smart voting contract, respectively. Then, after each voter is registered, a smart voting contract may then transfer one voting token to each registered voter, in one embodiment, one voting token for each voting contest. Distribution of the voting tokens may occur just after each voter is registered, or it may occur all at once, i.e., just before a voting contest begins.

As an example of the foregoing, voting administrator node 100 may generate and distribute a smart voting contract to each of the computing nodes of distributed ledger 101. The smart voting contract registers voter A as a registered voter, and issues a first voting token to voter A to use in a presidential election and a second voting token to voter A to use in a gubernatorial election in the state of Nevada. The first token can only be used by voter A to vote for candidates in the presidential election and for no other election. Similarly, the second token may only be used by voter A to vote in the gubernatorial election and for no other election. Other restrictions may be placed on voting tokens, including a limitation that voting tokens cannot be sold or swapped, cannot be used to purchase goods or services, and cannot be used after a voting contest has concluded. In some embodiments, these limitations are embodied in the smart voting contract executed by the computing nodes of distributed ledger 101. In general, voting tokens are issued by administrator node 100 or the smart contract to registered voters by generating distributed ledger-based initial voting token transfer transactions that transfer "ownership" of a voting token from the voting administrator or the smart voting contract (i.e., a cryptographic, cryptographic wallet associated with the voting administrator or the smart voting contract, respectively), to a cryptographic, cryptographic wallet associated with each registered voter.

In one embodiment, each voting token comprises an ERC-721-compliant token. ERC-721 is an open standard that describes how to build "non-fungible" or unique tokens on the Ethereum blockchain. This standard is very similar, in many ways, to ERC-20, which is a well-known Ethereum standard used to create custom Ethereum tokens. However, in contrast to ERC-20 tokens, ERC-721 tokens are "unique" and non-interchangeable with other tokens (non-fungible). All ERC-721-based tokens are identified by a unique identifier, commonly referred to as a tokenID, and can be owned only by a single voter. In some embodiments, an association is made between a particular voting token and a registered voter. For example, an address of the voting token is associated with an address of the registered voter, i.e., a cryptographic wallet of a registered voter, to whom the voting token was assigned.

After the voting tokens have been issued to the registered voters, and a voting contest begins, voters may cast electronic votes for candidates of their choosing using their personal communication device 102-106. Each personal communication device may execute an app, or access a secure voting website, that allows each registered voter to cast one or more electronic votes. electronic votes in the form of "voting transaction requests" are sent from the personal communication device to distributed ledger 101, i.e., to each of the computing nodes 108-116. A voting transaction request is a request by a registered voter to cast a vote in a voting contest, where the request is formatted in accordance with a distributed ledger transaction request for validation by each of the computing nodes of distributed ledger 101 and for recording the vote on a blockchain produced by distributed ledger 101. Each voting transaction request identifies the registered voter who cast the request (i.e., using a cryptographic digital signature and/or by including a digital address of a cryptographic wallet associated with each voter), a target address (such as a public address associated with the smart voting contract), an identification of a voting token used to cast the vote, and a selection of a particular candidate associated with the voting contest. The voting transaction request is similar to other distributed ledger requests, such as a transaction request by one person to transfer a number of cryptocurrencies from that person to another person or entity. Each distributed ledger technology defines such transaction requests, and a voting transaction request is formatted in accordance with the type of distributed ledger technology used by distributed ledger 101.

In one embodiment, each voting transaction request comprises an identification of a particular voting token and a digital address associated with a cryptographic, cryptographic wallet of the smart voting contract. When voting transaction requests are received, the smart voting contract determines which candidate was selected and updates a tally associated with the selected candidate. In this embodiment, voting tokens associated with each the voting transaction requests are transferred from a cryptographic, cryptographic wallet of each registered voter to the cryptographic, cryptographic wallet of the smart voting contract. In another embodiment, each candidate in a voting contest is pre-assigned a particular, cryptographic, cryptographic wallet, and each voting transaction request comprises an identification of one or more of these candidate wallets. As each voting transaction request is processed, a voting token is transferred from a registered voter to a wallet associated with the voter's selected candidate.

As each voting transaction request is received by the computing nodes of distributed ledger 101, the smart voting contract executed by the computing nodes authenticates and verifies each vote, i.e., that each received vote is actually from a person purported to be a particular registered voter, that a person identified in the voting transaction request is, in fact, registered to vote in the voting contest, that the voting transaction request is received within a predetermined voting time period, that the voting token identified in the voting transaction request has only been used once, etc. After authentication and verification, each of the computing nodes records which candidate associated with the voting contest was chosen in each voting transaction request, i.e., by keeping a tally of voting transaction requests received for each candidate in the voting contest, or by transferring a voting token to a cryptographic tokened wallet associated with each candidate. Each of the computing nodes may then create a voting transaction, comprising information related to the voting transaction request, such as an identification of a particular voting contest, an identification of the registered voter who submitted the voting transaction request, an identification of the voting token used, an identification of which candidate was selected, a date and time that the voting transaction request was received or cast, a running tally of voting transaction requests received for each candidate, etc. The verified voting transactions may then be validated by each of the computing nodes in disturbed ledger 101 using traditional blockchain validation techniques (such as proof-of-work, proof-of-stake, etc.), and, when validated, memorialized in a cryptographic block produced by one or more of the computing nodes, where the cryptographic block is then added to an existing blockchain of distributed ledger 101.

During an election contest, voters may cast electronic votes using the voting tokens that have been issued to them. In one embodiment, when a user selects a candidate from two or more candidates in an election contest using either an app executed on a voting device 102-106, or via a secure website accessed by a voting device 102-106, a voting token associated with the voting contest is transferred from, for example, a cryptographic, cryptographic wallet associated with a voter to a public, cryptographic address of a smart voting contract executed by distributed leger 101. In this embodiment, a voting transaction request is created by the app or by the secure website that indicates a candidate selected by the voter and a public address of the smart voting contract. The voting transaction request is then sent to the distributed ledger 101, to the smart voting contract public address, where it is validated and memorialized by the computing nodes 108-116. The smart contract keeps a tally of voting transaction requests (i.e., votes) received for each candidate, and at the conclusion of the voting contests, determines a winner by comparing the cumulative vote totals for each candidate.

In one embodiment, one or more private sidechains, such as private sidechain 120, may be used to mask voting results until after a predetermined voting time period has ended, i.e., a voting contest has concluded. A private sidechain comprises a distributed ledger that maintains a blockchain that is not, generally, publicly available for viewing. Sidechaining comprises any mechanism that allows tokens from one blockchain to be securely used within a completely separate blockchain but still moved back to the original chain if necessary. By convention, the original chain is normally referred to as the "main chain", while any additional blockchains which allow users to transact within them in the tokens of the main chain are referred to as "sidechains". For example, a public Ethereum-based network that had a linkage allowing voting tokens to be securely moved from the public Ethereum main chain onto it and back would be considered to be a sidechain of the public network. Thus, as tokens are received by a smart voting contract executed by distributed ledger 101, they could be transferred to private sidechain 120 until a voting contest has concluded. Then, the smart voting contract could retrieve the voting tokens from private sidechain 120, tally the votes in accordance with each token, verify the results are the same for each smart voting contract being executed by devices 108-116, then update its public blockchain with the results, including the date and time each token was received (i.e., identified in a voting transaction request), an origination address identifying the voter who cast each token, and the candidate selected by the voter. In one embodiment, private, cryptographic blocks may be generated by private sidechain 120 while a voting contest is occurring and the private, cryptographic blocks transferred to distributed ledger 101, where the private, cryptographic blocks may be integrated into the public blockchain maintained by distributed ledger 101. The results of the voting contest would then be publicly available for accountability purposes.

In some embodiments, a smart voting contract may require information from one or more public sources, such as the current date and time in order to determine when a registration process may begin, when a voting contest begins and when a voting contest ends. Such data may be fed into distributed ledger 101 and used for smart voting contract execution via, for example, data feeds and APIs, as distributed ledger 101 typically cannot directly "fetch" data. A real-time data feed may be provided to distributed ledger 101 via an "oracle", i.e., a computing node running middleware between a source of data and a smart voting contract executed on distributed ledger 101, such as oracle 122 in FIG. 1. Oracles can be software or hardware-based. A hardware-based oracle, for example, might be an RFID sensor that determines a location of a voter when a voter casts a vote. A software oracle, by contrast, could be an application that feeds information through an API to distributed ledger 101. In either case, oracle 122 may be coupled to distributed ledger 101 via white-area network 118, as shown.

Figure 2:
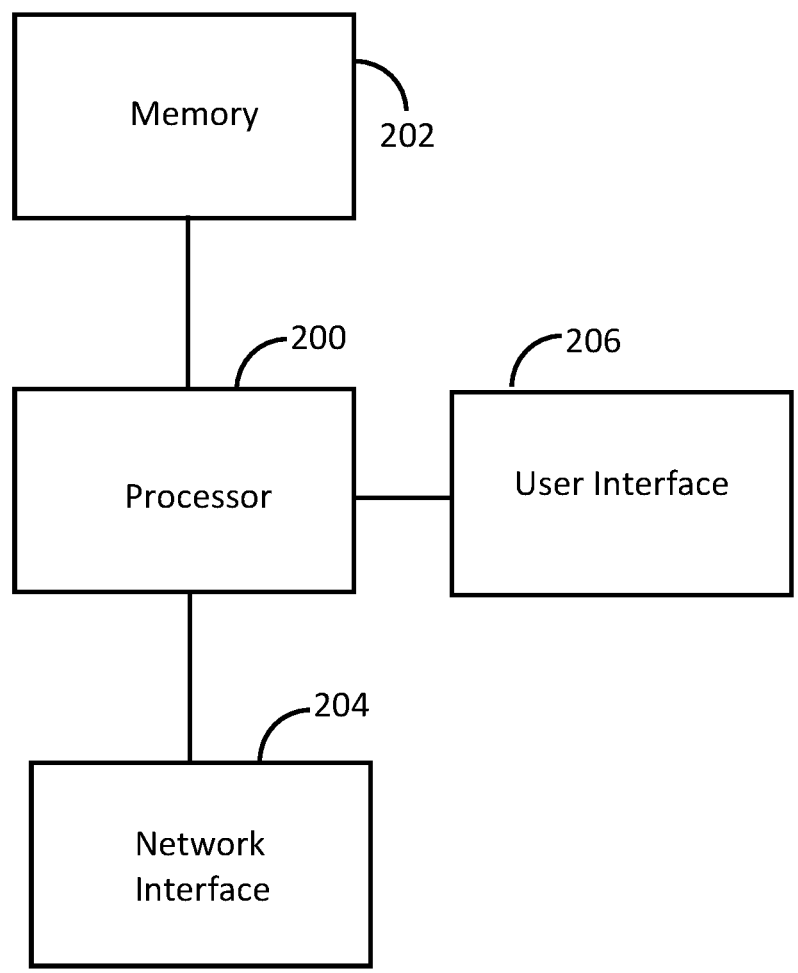
FIG. 2 is a functional block diagram of any of the computing nodes in the system shown in FIG. 1.

FIG. 2 is a simplified functional block diagram of any of the nodes shown in FIG. 1, comprising processor 200, non-transitory memory 202, network interface 204 and user interface 206 (in some cases).

Processor 200 is configured to provide general operation of each node by executing processor-executable instructions stored in memory 202, for example, executable computer code. Processor 200 typically comprises one or more general or specialized microprocessors, microcontrollers, and/or customized ASICs, selected based on computational speed, cost, power consumption, and other factors relevant to each node. After processor 200 has been programmed with the processor-executable instructions, it becomes a specialized processor capable of performing one or more new and non-obvious methods as described later herein.

Memory 202 is coupled to processor 200 and comprises one or more non-transitory electronic, digital information storage devices, such as static and/or dynamic RAM, ROM, flash memory, or some other type of electronic, optical, or mechanical memory device. Memory 202 is used to store processor-executable instructions for operation of each node, respectively. The processor-executable instructions are different among the various types of computing nodes. For example, a personal communication device computing node would be loaded with processor-executable instructions appropriate for such a personal communication device, while computing nodes 108-116 would be loaded with a different set of processor-executable instructions, suitable for performing operations associated with nodes of a distributed ledger. It should be understood that in some embodiments, a portion of memory 202 may be embedded into processor 200 and, further, that memory 202 excludes propagating signals. Memory 202 may additionally store information pertinent to voting contests, such as an identification of each voting contest, an identification of two or more candidates for each voting contest, voter registration information, voting transaction requests, a plurality of cryptographic wallet addresses belonging to each registered voter, a plurality of cryptographic wallet addresses belonging to each candidate in each voting contest, a vote tally for each candidate in each voting contest, voting contest parameters, such as a start and end date and time of each voting contest, a minimum age to participate in each voting contest, a residency requirement for each voting contest, etc.

Network interface 204 is coupled to processor 200, comprising circuitry for sending and receiving digital data to/from other nodes in distributed ledger-based system 98 via wide-area network 118. For example, network interface 204 may comprise circuitry and firmware for sending and receiving digital data in the form of network packets, for example, in association with a TCP/IP protocol. Such circuitry and/or firmware is well known in the art. The digital data may comprise voting transaction requests, verified voting transactions User interface 206 is coupled to processor 200 and allows a user to interact with one of the computing nodes, especially used when a computer node comprises personal communication devices 102 through 106. User interface 206 may comprise one or more pushbuttons, touchscreen devices, biometric readers, switches, sensors, keypads, and/or microphones that generate electronic signals for use by processor 200 upon initiation by a user. User interface 206 may alternatively, or additionally, comprise one or more liquid crystal displays (LCD), one or more light emitting diode displays (LEDD), one or more light emitting diodes (LEDs), light arrays, or any other type of visual display. Further, user interface 206 may also comprise an audio device, such as a speaker and related amplification circuitry, for audible presentation of information to a user.

Figure 3A:
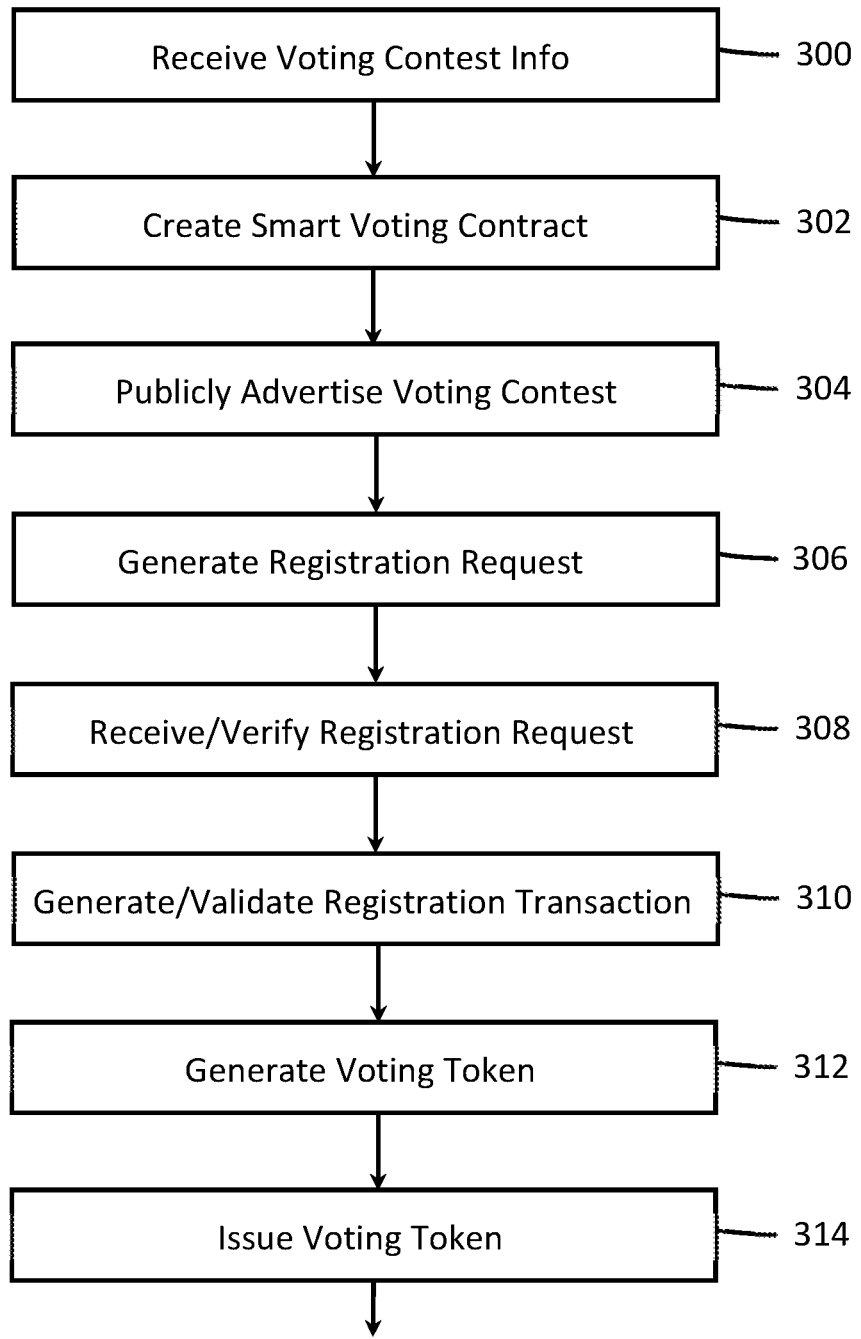
FIGS. 3A-3C represent a flow diagram illustrating one embodiment of a method for administrating distributed ledger-based voting contests.
Figure 3B:
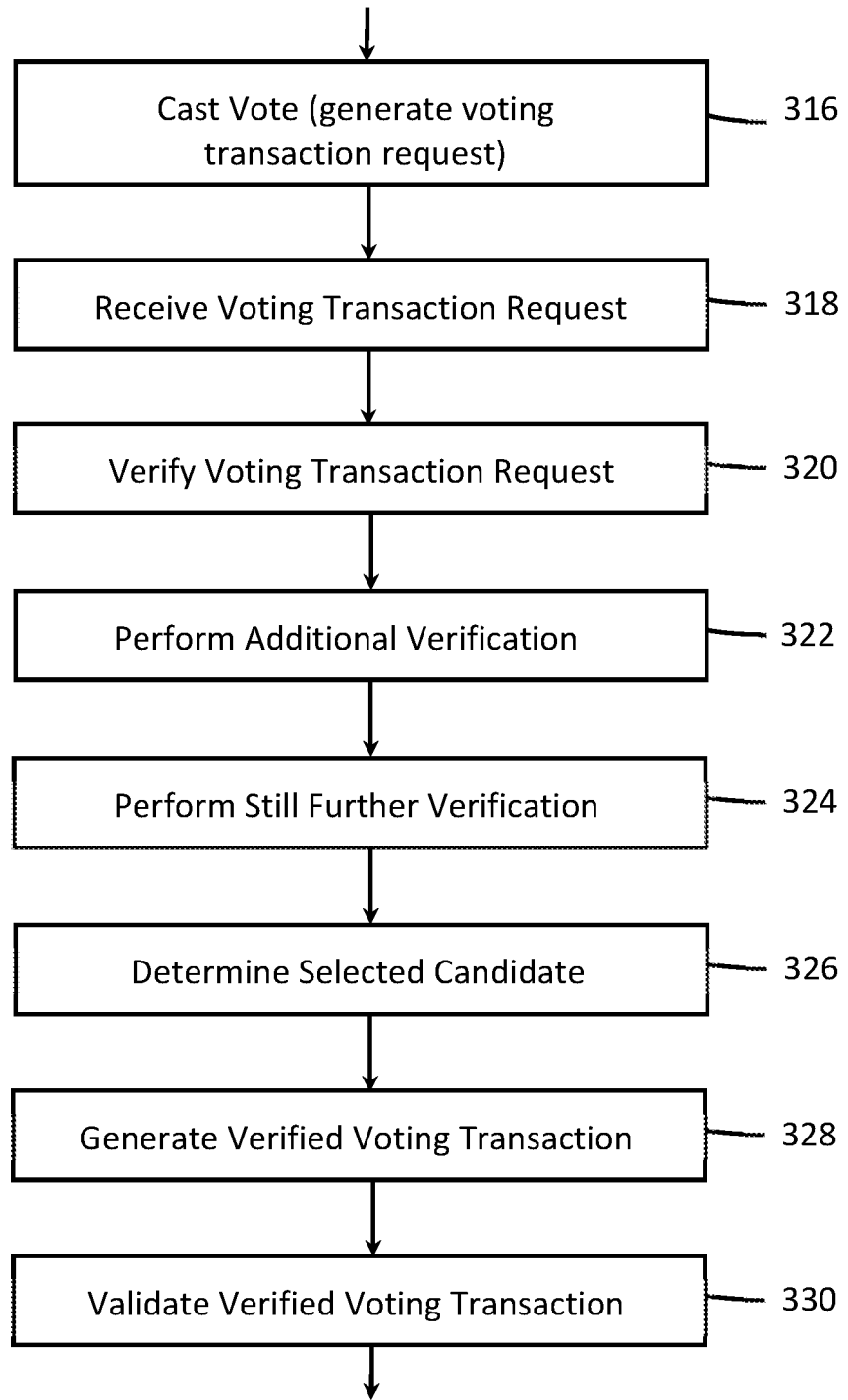
Figure 3C:
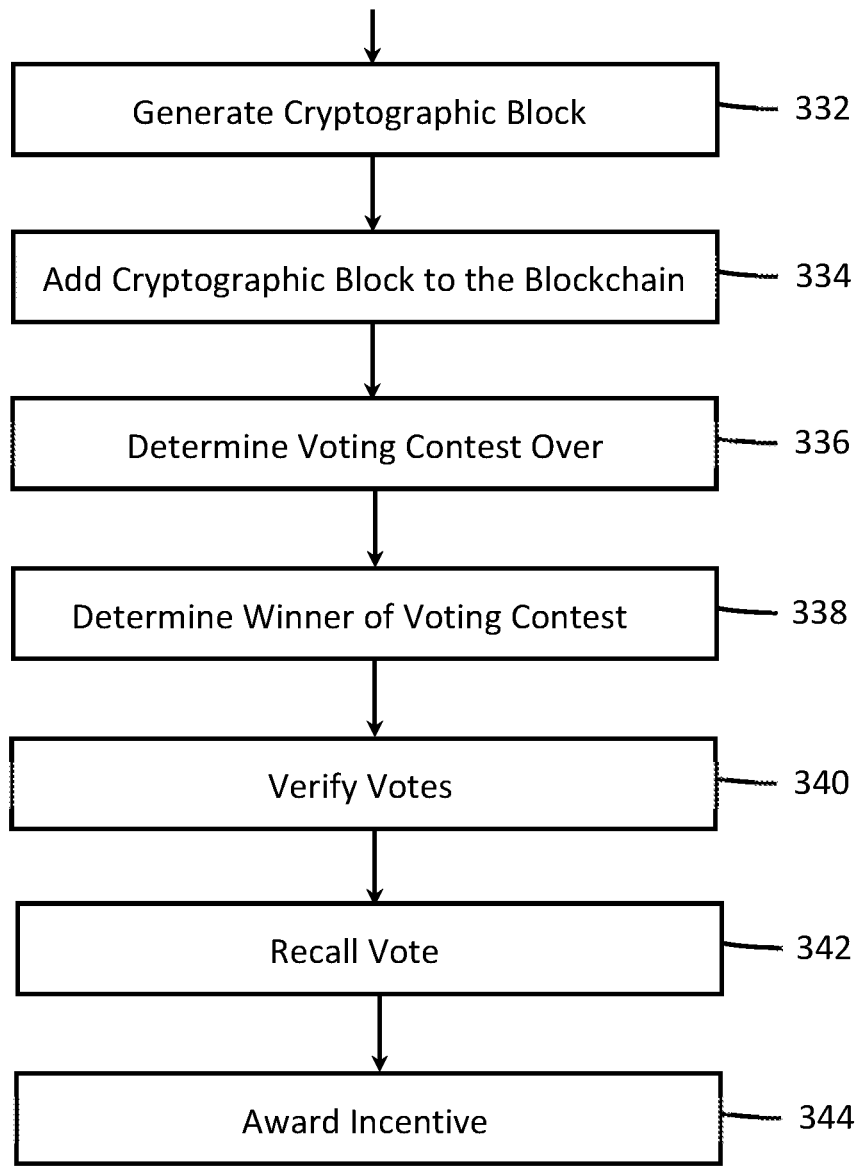

FIG. 3 is a flow diagram illustrating one embodiment of a method, performed by each of the computing nodes 108-116 of distributed ledger 101 in voting system 98, for administering a voting contest. It should be understood that in some embodiments, not all of the steps shown in FIG. 3 are performed, and that the order in which the steps are carried out may be different in other embodiments. It should be further understood that some minor method steps have been omitted for purposes of clarity. While only a single voting contest is described, in practice, multiple, simultaneous voting contests typically occur, such as in the case of simultaneous voting contests at the federal, state, and local level, and each of the computing nodes 108-116 of distributed ledger 101 may be capable of administrating multiple voting contests simultaneously.

At block 300, a voting administrator receives information regarding an upcoming voting contest. The upcoming voting contest may be a politically-based, sports-based, social-based (i.e., a contest to determine which media personality is most admired, a poll to determine who will win best picture award at the Oscars, a poll to determine an outcome of a TV show, etc.), etc.

At block 302, the voting administrator, via processor 200 of voting administrator node 100, may create a smart voting contract for administrating the upcoming voting contest. The smart voting contract comprises processor-executable instructions that causes each computing node 108-116 of distributed ledger 101 to perform certain activities relating to administration of the upcoming voting contest. For example, the smart voting contract may comprise instructions that causes the computing nodes 108-116 to register potential voters in order to vote in the upcoming voting contest, create and distribute cryptographic voting tokens (such as tokens generated in accordance with the ERC-721 standard, for example), receive voting transaction requests from the registered voters, tally candidate selections indicated in each voting transaction request, generate verified voting transactions, validate the verified voting transactions, generate cryptographic blocks based on the verified voting transactions and declare a winner after the voting contest has concluded. Further details of each of these actions is provided below. The voting administrator may distribute the smart can't attract to the computing nodes 108-116 via administrator node 100, i.e., by processor 200 and network interface 204 of voting administrator node 100, and wide-area network 118, to a public address on distributed network 101 that identifies the smart voting contract.

At block 304, the voting administrator may publicly advertise the upcoming voting contest, by providing an identification of the upcoming voting contest, a time period during which voters may cast votes, a listing of two or more candidates associated with the upcoming voting contest, an age requirement in order to vote, a residency requirement required to vote, etc. The voting administrator may use administrator computing node 100, i.e., processor 200 and network interface 204 of voting administrator node 100, to send this information to potential voters, for example, sending this information to one or more public websites, a specific, secure website that allows voters to cast votes, social media platforms, email, text, etc. In another embodiment, the voting administrator may send this information to potential voters via a dedicated software application or "app" running on a personal communication device, such as a mobile phone or tablet computer. In this embodiment, the voting administrator makes information pertaining to the upcoming voting contest available to a voting app running on personal communication devices of potential voters. The information may be pushed to the app, or pulled by the app, and displayed to potential voters on a display screen of each personal communication device.

The voting administrator may additionally distribute the digital public address associated with the smart voting associated with the upcoming voting contest. This is used in an embodiment where a voting app or voting website generates voting transaction requests, where each voting transaction request comprises the digital public address, so that each voting transaction request is routed to an appropriate smart voting contract. In other embodiments, the digital public address associated with the smart voting contract is embedded into voting tokens as voting tokens are created. Generally, each voting token comprises a unique identifier in order to prevent duplicate voting and to associate each voting token to a particular registered voter.

In one embodiment, the voting administrator may additionally distribute two or more digital public addresses, one public address associated with each candidate in the upcoming voting contest, such as cryptographic wallet addresses. In this embodiment, when a voting app or voting website creates a voting transaction request based on a selection of one of the candidates in the voting contest, the voting app or voting website includes the digital public address associated with the selected candidate in the voting transaction request. When the voting transaction request is received by the smart voting contract, i.e., each computing node 108-116 of distributed ledger 101, a voting token associated with the voting transaction request is transferred to the digital public address associated with the selected candidate. In this way, a tally of votes received for each candidate can be maintained simply by knowing how many voting tokens have been transferred to each candidate's cryptographic wallet.

At block 306, potential voters may use the voting app running on their personal communication devices, executed by processor 200 of each personal communication device, to register to vote in the upcoming voting contest. In another embodiment, potential voters may use their personal communication devices to access a particular, secure voting website in order to register to vote in the upcoming voting contest, via processor 200 and network interface 204 of each personal communication device. In either case, a potential voter may create a distributed ledger-based registration request via the voting app or the voting website, the registration request typically comprising personal information of the potential voter, such as a name, address, age, date of birth, a distributed identifier (DID), driver's license information, digital public address of a cryptographic wallet associated with the potential voter, etc. In one embodiment, the registration request comprises a distributed ledger-based registration request, comprising the voter information listed above. In this embodiment, the distributed ledger registration request is in a format such that each of the computing node 108-116 of distributed ledger 101 can validate the transaction and add the transaction to a public lock chain of distributed ledger 101. In any case, the registration request is sent to the either voting administrator node 100 or to the smart voting contract being executed across distributed network 101 by processor 200 via network interface 204 of the personal communication device, through wide-area network 118.

At block 308, the registration request is received by either voting administrator node 100 or the smart voting contract by processor 200 via network interface 204 of either voting administrator node 100 or each computing node 108-116. In one embodiment, the voting administrator receives the registration request, and processor 200 of the voting administrator node 100 verifies the information in the request in order to verify the potential voter. In another embodiment, a processor 200 of each of the computing nodes 108-116, via the smart voting contract, independently verifies the registration request by authenticating it using a cryptographic proof, such as a digital signature of the potential voter, as is well-known in the art. At least some of the personal information in the registration request is then independently verified by each processor 200 in each computing node using well-known validation techniques used in distributed ledger networks, such as using distributed identifier validation techniques or disturbed ledger validation techniques (i.e., proof of work, proof of stake, etc.). In other embodiments, each of the processors 200 of computing nodes 108-116 verify at least some of the information in the registration request by comparing the personal information in the registration request to a database of previously-stored information of the potential voter, such as a database maintained by the voting administrator. In some embodiments, oracle 122 is used to provide previously-stored verification information of the potential voter to processor 200 via network interface 204. In some embodiments, the verification process also determines whether a voter has tried to register for a particular voting contest more than once, by checking a database of previously-registered voters.

At block 310, in one embodiment, after the distributed ledger registration request has been independently verified by each processor 200 of each of the computing nodes 108-116, each of the processors 200 of computing nodes 108-116 may generate a verified distributed ledger registration transaction and validate the verified distributed ledger registration transaction using traditional blockchain validation techniques. As a result of the validation, a processor 200 of one of the computing nodes of distributed network 101 generates a cryptographic block that may be added to the public blockchain maintained by distributed ledger 101, as a permanent, immutable record of who has registered to vote in the upcoming voting contest. The cryptographic block may comprise pertinent details of each registration, such as a name of the registered voter, a date of validation, a residence of the registered voter, etc.

During the validation process, each distributed ledger registration transaction is independently validated by each processor 200 in each of the computing nodes 108-116 to at least ensure that a particular voter has not tried to receive more than one voting token for a particular voting contest. If a particular voter has already received a voting token for a particular voting contest, the validation procedure performed by the computing nodes of distributed ledger 101 will determine so, and the subsequent distributed ledger registration transaction will be rejected.

At block 312, in one embodiment, as a result of a successful registration, a single voting token may be generated by the smart voting contract, i.e., by each processor 200 of computing nodes 108-116. In one embodiment, the voting token is created by processor 200 in accordance with the well-known ERC-721 standard. The voting token may comprise an identification of the registered voter, i.e., in one embodiment, by a digital public address of a cryptographic wallet associated with the registered voter, an identification of the particular upcoming voting contest, a digital public address associated with the smart voting contract, an identification of the particular voting token (i.e., a tokenID), a digital public address of a cryptographic wallet associated with the smart voting contract, two or more digital public addresses associated with each candidate in the upcoming voting contest, respectively, etc.

In another embodiment, hundreds, thousands, or even millions of voting tokens were previously created by the smart voting contract, or by another entity, such as the voting administrator (i.e., by generating and executing a second smart contract specifically for issuing voting tokens). Each of these voting tokens may have been stored in a cryptographic wallet associated with the smart voting contract or voting administrator, respectively. Each of the voting tokens comprises the same or similar information as described above with respect to the generation of a single voting token after a successful registration has occurred.

At block 314, in either case, after token creation, a voting token may be issued to the registered voter by the smart voting contract or the voting administrator. In one embodiment, either the smart voting contract or the voting administrator, via one or more processors 200, may create a voting token transfer transaction that transfers "ownership" of the voting token from the smart voting contract, or the voting administrator, to the registered voter. For example, the voting token transfer transaction may identify a particular voting token that is being transferred, a digital public address of a cryptographic wallet associated with the smart voting contract or the voting administrator, and a digital public address of a cryptographic wallet associated with the registered voter. The transfer transaction may then be validated by each processor of computing nodes 108-116 of distributed ledger 101 and a cryptographic block generated by one of the processors 200 when one or more voting tokens have been issued to one or more registered voters.

Over time, the smart voting contract, or the voting administrator, via respective processors 200 and network interfaces 204, issues hundreds, thousands or even millions of voting tokens associated with the upcoming voting contest to hundreds, thousands or even millions of registered voters, respectively.

At block 316, in one embodiment, when it is time to cast a vote, the registered voter votes for a particular candidate in the voting contest by causing processor 200 of the registered voter's personal communication device to generate a voting transaction request. In one embodiment, a voting app executed by processor 200 of the personal communication device is used to create the voting transaction request. A voting transaction request comprises a blockchain-based request to transfer a voting token from the registered voter to the smart voting contract, and/or to a cryptographic wallet associated with a candidate selected by the registered voter. The voting transaction request initiates a process by the smart voting contract to verify and validate the voting transaction request, thus casting a vote for one of the candidates, and memorializing the registered voter's selection on the public blockchain maintained by distributed ledger 101. In other words, the voting transaction request may initiate a change of state of the blockchain maintained by distributed ledger 101 from a previous state to a "next" state, i.e., from candidate A having 100 votes to candidate A having 101 votes.

All of the candidates in the voting contest may be presented to the registered voter via processor 200 of the personal communication device via a display screen of the personal communication device, whether using a voting app or by accessing a secure voting website. Processor 200 of the person communication device receives a selection one or more of the candidates from the registered user via a user interface of the personal communication device. Upon selection of the one or more candidates, processor 200 of the personal communication device, or the secure voting website, creates a voting transaction request comprising a cryptographic transaction in accordance with a distributed ledger protocol of distributed ledger 101. For example, the voting transaction request may comprise an address of the smart voting contract executed on distributed ledger 101, an indication of a selection of the one or more candidates, and an identification of the registered voter (i.e., such as an identification of the voting token that was issued to the registered voter in associated with the particular voting contest, and/or a cryptographic wallet address associated with the registered voter) and an identification of a particular voting token used in the voting transaction request. In another embodiment, an indication of a selection of the one or more candidates may comprise a cryptographic wallet address associated with the one or more selected candidates. Each voting transaction request may be cryptographically signed by the registered voter in order for the smart voting contract to authenticate that it was actually the registered voter, and not some imposter, who provided the voting transaction request. In another embodiment, the registered voters personal communication devices used to access a secure website that creates the voting transaction request. In either case, after the voting transaction request has been created, it is sent by processor 200 via network interface 204 to the smart voting contract on distributed ledger 101 via wide-area network 118 to an address on distributed ledger 101 identified in the voting token associated with the voting contest.

At block 318, the voting transaction request from the registered voter is received by processor 200 via network interface 204 of each of the computing nodes 108-116 and is processed by the smart voting contract running on each of the computing nodes 108-116.

At block 320, each of the computing nodes 108-116, executing the smart voting contract by processor 200, may verify the voting transaction request by first determining if the voting transaction request has been received during a predetermined voting contest time period, such as any time prior to three weeks before an election day associated with the voting contest. The predetermined voting contest time period is typically stored in the smart voting contract. The processor 200 compares a present date and time that the voting transaction request was received, or cast by the registered voter, to the information stored in the smart voting contract. The present date and time may be obtained by providing a roof quest to oracle 122 via network interface 204. Any voting transaction requests determined to be received by processor 200 outside of the predetermined voting contest time period may be ignored by processor 200 and one or more of the computer nodes 108-116 may generate a message to the registered voter who voted early or late, informing the registered voter that his or her vote did not get counted because it was cast too early or too late. In this case, the voting token associated with the attempted vote is still maintained in the registered voter's digital wallet.

At block 322, each of the computing nodes 108-116, executing the smart voting contract by processor 200, may continue to verify the voting transaction request by determining whether it was cast by a registered voter. In this case, each processor 200 may compare an identification of the registered voter to a previously-stored listing of registered voters. The previously-stored listing of registered voters may be stored in a single database, such as in voting administrator node 100, or it may be stored in a distributed fashion by each of the computing nodes 108-116 of distributed ledger 101, or some other distributed ledger.

At block 324, each of the computing nodes 108-116, executing the smart voting contract by processor 200, may continue to verify the voting transaction request by determining whether it was cast by a registered voter associated with the particular voting token identified in the voting transaction request. Typically, each voting transaction request identifies a particular voting token used to cast a vote. This information may be compared by processor 200 to a previously-stored database linking each, issued voting token with a particular registered voter. The previously-stored database linking registered voters to particular voting tokens may be stored in a single database, such as in voting administrator node 100, or it may be stored in a distributed fashion by each of the computing nodes 108-116 of distributed ledger 101, or some other distributed ledger. In another embodiment, each processor 200 determines that the voting transaction request originated from a registered voter that was previously issued the voting token identified in the voting transaction request using properties of the voting token itself, such as those specified in ERC-721 or similar.

At block 326, after the voting transaction request has been verified, each of the computing nodes 108-116, executing the smart voting contract by processor 200, may determine which candidate, or candidates, was/were selected by the registered voter.

In one embodiment, each of the computing nodes 108-116, executing the smart voting contract by processor 200, determines which candidate, or candidates, was/were selected by the registered voter by processing an indication in the voting transaction request of a selection of one or more of the candidates associated with the voting contest. The indication may comprise a name of a selected candidate (s). In this embodiment, each of the computing nodes 108-116 stores a tally of ballots received for each candidate in the voting contest in memory 202, and increments a tally for the selected candidate(s) based on the indication in the voting transaction request.

In another environment, where the voting transaction request comprises a public digital address of a cryptographic wallet associated with a selected candidate, determination which of candidate(s) was/were selected occurs after validating the voting transaction request by each of the computing nodes 108-116 of distributed ledger 101, as explained below.

At block 328, after the voting transaction request has been verified, each of the computing nodes 108-116 may generate a verified voting transaction. In one embodiment, the verified voting transaction comprises the voting transaction request. In another embodiment, the verified voting transaction comprises additional information, such as a running tally of each candidate's votes in the voting contest.

In one embodiment, the verified voting transaction comprises a running tally of votes received to date for each of the candidates as the voting contest progresses, where the running tallies are encrypted using a public key known to all of the computing nodes 108-116. At some later point in time, each verified voting transaction may be validated by each of the computing nodes 108-116, by decrypting the running tallies and confirming that the running tallies processed by each computing node is identical among at least a majority of the computing nodes 108-116. In another embodiment, after the voting contest has concluded, rather than decrypt and validate verified voting transactions, one of the computing nodes 108-116 may generate a final cryptographic block, comprising an unencrypted history of the running tallies of each candidate in order to provide accountability to voting system 98.

At block 330, the verified voting transaction of each computing node is validated by each of the computing nodes 108-116, or by computing nodes of another distributed ledger. In one embodiment, each computing node validates the verified voting transaction that it generated. in another embodiment, each computing node validates verified voting transactions produced by each of the other computing nodes. Each of the computing nodes 108-116 may validate the voting transaction request in order to determine whether the voting token associated with the voting transaction request was previously used, either by the registered voter submitting the voting transaction request, or another registered or unregistered voter. Validations may be performed using traditional distributed ledger validation techniques (i.e., consensus via proof-of-work, proof-of-stake, etc.).

At block 332, when the voting transaction request has been validated, a cryptographic block may be generated by one of the computing nodes 108-116. Typically, this is performed when a plurality of verified voting transactions has been validated. The cryptographic block typically comprises information in the plurality of verified voting transactions. The cryptographic block comprises details of each voting transaction request, i.e., a cryptographic identification of registered voters who submitted voting transaction requests, the candidate selection made by each registered voter, and identification of the voting token used to cast each vote and a date and time that the voting transaction request was created and/or received by each of the computing nodes 108-116. In one embodiment, where each of the computing nodes 108-116, executing the smart voting contract by processor 200, stores a running tally or votes received for each candidate in the voting contest, the cryptographic block may additionally comprise the running tally of each candidate. In another embodiment, where each candidate is pre-assigned, a digital public address associated with a particular cryptographic wallet, the cryptographic block may comprise a running tally of voting tokens received by each of the particular cryptographic wallets.

At block 334, the cryptographic block is added to the blockchain of distributed ledger 101 by processor 200 of one of the computing nodes 108-116. As the voting contest progresses, additional cryptographic blocks are created by one of the computing nodes 108-116, each cryptographic block comprising information pertaining to one or more voting transaction requests submitted by the registered voters, and added to the blockchain. In this way, the blockchain stores a current state of the smart voting contract and, thus, a current state of the voting contest.

At block 336, each processor 200 of the computing nodes 108-116 may determine when the voting contest has concluded, by determining that a current date and time meets or exceeds an end date and time defined by the predetermined voting contest time period as indicated in the smart voting contract. Oracle 122 may be used by each processor 200 to retrieve a current date and time. Any voting transaction requests received by each processor 200 after the end time of the voting contest is typically ignored by each processor 200.

At block 338, each of the computing nodes 108-116, executing the smart voting contract by processor 200, may determine a winner of the voting contest. In one embodiment, where each of the computing nodes 108-116, executing the smart voting contract by processor 200, stores running tallies of the voting transaction requests received for each of the candidates in the voting contest, each of the computing nodes 108-116, executing the smart voting contract by processor 200, may issue a final distributed ledger transaction based on the final tallies of votes received for each of the candidates, and the final distributed ledger transaction is validated by each of the computing nodes 108-116 of distributed ledger 101. A final cryptographic block may be then created and added to the blockchain.

In another embodiment, each of the computing nodes 108-116, executing the smart voting contract by processor 200, may determine a winner of the voting contest by tallying the number of voting tokens received by each candidate's cryptographic wallet in an environment where each of the candidates is pre-assigned a public digital address associated with a cryptographic wallet. In one embodiment, each of the computing nodes 108-116, executing the smart voting contract by processor 200, determines how many voting tokens were received by each of the candidate's cryptographic wallets by examining a last cryptographic block generated while the voting contest was still in effect. In this embodiment, each verified voting transaction comprises a tally of voting tokens received by each of the candidate's cryptographic wallets. Each of the computing nodes 108-116, executing the smart voting contract by processor 200, can then determines how many voting tokens were received by each of the candidates, and then each selects the candidate with the highest total number of voting tokens as the winner.

In an embodiment where the smart voting contract is executed by computing nodes of a private sidechain, after the voting contest has concluded, the computing nodes of the private sidechain may provide any private cryptographic blocks that were created during the voting contest to a public distributed ledger. The private cryptographic blocks may then be integrated into a public blockchain of the public distributed ledger. In this embodiment, the results of the voting contest while the voting contest is in effect is generally hidden from the public by the private sidechain, so as not to skew votes one way or another based on which candidate is leading at any particular point during the voting contest. After the voting contest has concluded, the entirety of the voting contest results may be made public on the public blockchain for accountability and integrity purposes.

At block 340, at almost any time during or after the voting contest, registered voters may verify that their voting transaction requests were received by the smart voting contract and processed correctly. A registered voter, for example, may utilize the voting app being executed on the registered voters personal communication device, or via the voting website, and generate a request to inspect one of the cryptographic blocks that were created during the voting contest. The request may comprise an identification of the registered voter (for example, a public digital address associated with the registered voter's cryptographic wallet), and/or an identification of the particular voting token used to cast the voter's vote. The request is provided to distributed ledger 101, and one of the encrypted blocks is identified that matches at least some of the information in the request. The block itself may then be provided back to the registered voter or the smart contract may process the block and provide only information pertinent to the particular registered voter who submitted the request.

At block 342, in one embodiment, a voter who cast a vote may recall the vote, either prior to validation by devices 108-116 or even after. In this case, the smart voting contract may receive a request by a voter to recall the voter's previous vote and an identification of the registered voter and/or an identification of the particular voting token used to cast the vote. In response, as long as the predetermined voting period has not ended, the smart voting contract may adjust a running tally of one of the candidates in order to decrement a running tally associated with the recall request, and generate a recall transaction comprising information about the vote wanting to be rescinded, and the adjusted running tally associated with the particular candidate. The recall transaction is then validated by computing nodes 108-116 using a blockchain consensus mechanism. The recall transaction may additionally comprise a transfer of the particular voting token from the smart contract back to the registered voter who requested the recall, or creation of a replacement voting token. The voter who receives the replacement token may then use the replacement token to cast another vote for a different candidate, or even the same candidate, and the replacement token is received by the smart voting contracts and executed upon as if the replacement token was an original voting token.

At block 344, in one embodiment, each of the computing nodes 108-116, executing the smart voting contract by processor 200, may award a promised incentive to voters who participated in the voting contest. For example, prior to the voting contest, any voter who participated in the particular voting contest may have been incentivized by the payment of $1/100$ of one bitcoin to cast a vote one way or the other. When the smart voting contract determines that a voter who was previously promised the payment actually cast a vote, the smart voting contract causes a transfer of the incentive from the smart voting contract to each of the promised voters who cast a vote.

In the description above, certain aspects and embodiments of the invention may be applied independently and some of them may be applied in combination as would be apparent to those of skill in the art. For the purposes of explanation, specific details are set forth in order to provide a thorough understanding of embodiments of the invention.

The above description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the embodiments as set forth in the appended claims.

Although specific details are given to provide a thorough understanding of at least one embodiment, it will be understood by one of ordinary skill in the art that some of the embodiments may be practiced without disclosure of these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a method, a process or an algorithm performed by a processor, which may be depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. The terms "computer-readable medium", "memory", "storage medium", and "memory" includes, but is not limited to, portable or non-portable electronic memories, optical storage devices, and various other mediums capable of storing, containing, or carrying instruction(s) and/or data. These terms each may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, RAM, ROM, flash memory, solid state disk drives (SSD), etc. A computer-readable medium or the like may have stored thereon code and/or processor-executable instructions that may represent a method, algorithm, procedure, function, subprogram, program, routine, subroutine, or any combination of instructions, data structures, or program statements.

Furthermore, embodiments may be implemented by hardware, software, firmware, middleware, microcode, hardware description languages, or any combination thereof. When implemented in software, firmware, middleware or microcode, the program code, i.e., "processor-executable code", or code symbols to perform the necessary tasks (e.g., a computer-program product) may be stored in a computer-readable or machine-readable medium. A processor(s) may perform the necessary tasks.

I claim:

1. A method for administrating voting contests using a distributed ledger-based voting system, comprising:
    issuing, by a smart voting contract executed by a plurality of computing nodes of a distributed ledger, a plurality of cryptographic voting tokens to a plurality of voters, respectively, each of the plurality of cryptographic voting tokens for allowing the plurality of voters to cast a single vote in a voting contest, each of the plurality of cryptographic voting tokens comprising a unique identifier, a public digital address associated with the smart voting contract, and a public digital address associated with a particular one of the plurality of voters, respectively;
    receiving, by the plurality of computing nodes, a plurality of voting transaction requests from the plurality of voters over a wide-area network, each of the plurality of voting transaction requests comprising a selection of one or more candidates associated with the voting contest, an identification of a particular voting token previously issued to each respective voter and associated with the voting contest; and a public digital address associated with a particular voter who submitted a voting transaction request; and
    determining a final result of the voting contest based on the plurality of voting transaction requests received.

2. The method of claim 1, wherein issuing the plurality of cryptographic voting tokens to each of the plurality of voters comprises:
    receiving, by each of the plurality of computing nodes via a wide-area network, a distributed ledger registration request from a first potential voter to participate in the voting contest, the distributed ledger registration request comprising a cryptographically-signed public digital address of a cryptographic wallet associated with the first potential voter;
    validating, by the plurality of computing nodes, the distributed ledger registration request; and
    after validating the distributed ledger registration request, issuing, by the plurality of computing nodes, a first cryptographic voting token from a first public digital address of a first cryptographic wallet associated with the smart voting contract to a second public digital address associated with a second cryptographic wallet associated with the first potential voter.

3. The method of claim 2, further comprising:
    receiving, by the plurality of computing nodes via the wide-area network, a second distributed ledger registration request for the first potential voter to participate in the voting contest;
    determining, by the plurality of computing nodes, that the first potential voter already received a first cryptographic voting token associated with the voting contest; and
    after determining that the first potential voter already received the first cryptographic voting token associated with the upcoming registration request, refraining, by the plurality of computing nodes, to issue a second cryptographic voting token to the digital address of the cryptographic wallet associated with the first potential voter.

4. The method of claim 1, further comprising:
    verifying, by each of the computing nodes, each of the voting transaction requests;
    generating, by each of the computing nodes, a verified voting transaction for each of the voting transaction requests that were verified, each of the verified voting transactions comprising a distributed ledger-based transaction that memorializes each of the candidate selections from each of the voters, respectively; and
    generating, by a first computing node of the plurality of computing nodes, a new cryptographic block when one or more verified voting transactions have been validated by each of the computing nodes, the new cryptographic block comprising the one or more verified voting transactions.

5. The method of claim 4, wherein the distributed ledger comprises a private sidechain, the method further comprising:
    creating cryptographic blocks by the private sidechain during the voting contest, each of the cryptographic blocks unavailable for public viewing;
    determining, by the plurality of computing nodes, that the voting contest has concluded; and
    upon determining that the voting contest has concluded, providing at least some of the cryptographic blocks to a public distributed ledger, making the cryptographic blocks publicly available.

6. The method of claim 1, wherein issuing the plurality of cryptographic voting tokens comprises:
- receiving a plurality of distributed ledger registration requests from the plurality of voters;
- independently verifying, by each of the computing nodes, each of the distributed ledger registration requests;
- generating a single cryptographic voting token each time that one of the distributed ledger registration requests is verified; and
- issuing the single cryptographic voting token to a particular voter associated with a particular distrusted ledger registration request independently verified by each of the computing nodes.

7. The method of claim 1, further comprising:
- receiving, by the plurality of computing nodes, a first voting transaction request;
- determining, by the plurality of computing nodes, that the voting contest has concluded; and
- ignoring, by the plurality of computing nodes, the first voting transaction request when the voting contest has concluded.

8. The method of claim 1, wherein each of the plurality of voting transaction requests comprises a cryptographic wallet address associated with one of the one or more candidates associated with the voting contest, and determining a final result of the voting contest comprises:
- verifying, by the plurality of computing nodes, each of the voting transaction requests;
- generating, by the plurality of computing nodes, a verified voting transaction for each of the voting transaction requests that were verified;
- validating, by the plurality of computing nodes, each of the verified voting transactions;
- determining, by the plurality of computing nodes, that the voting contest has concluded;
- determining, by the plurality of computing nodes, a cumulative number of verified and validated voting transactions in each of the cryptographic wallets associated with each of the candidates, respectively; and
- determining, by the plurality of computing nodes, a winner of the voting contest based on the cumulative number of verified and validated voting transactions in each of the cryptographic wallets.

9. The method of claim 1, further comprising:
- creating, by the plurality of computing nodes, two or more cryptographic wallets, each of the two or more cryptographic wallets associated with a particular one of the candidates associated with the voting contest; and
- providing, by the plurality of computing nodes, a public digital address associated with each of the two or more cryptographic wallets to each of the plurality of voters, respectively;
- wherein each of the plurality of voting transaction requests comprise an identification of one of the two or more cryptographic wallets associated with one of the candidates selected by each of the plurality of voters, respectively.

10. A distributed ledger-based system for administrating voting contests, comprising:
- a voting administrator node for generating a smart voting contract, the smart voting contract for administrating a first voting contest; and
- a distributed ledger, comprising a plurality of computing nodes, each of the computing nodes comprising a processor for executing processor-executable instructions stored in a memory of each of the computing nodes, that causes each of the processors to:
  - issue a plurality of cryptographic voting tokens to a plurality of voters, respectively, each of the plurality of cryptographic voting tokens for allowing the plurality of voters to cast a single vote in a first voting contest, each of the plurality of cryptographic voting tokens comprising a unique identifier, a public digital address associated with the smart voting contract, and a public digital address associated with a particular one of the plurality of voters, respectively;
  - receive a plurality of voting transaction requests from the plurality of voters over a wide-area network, each of the plurality of voting transaction requests comprising a selection of one or more candidates associated with the voting contest, an identification of a particular voting token previously issued to each respective voter and associated with the voting contest; and a public digital address associated with a particular voter who submitted a voting transaction request; and
  - determine a final result of the voting contest based on the plurality of voting transaction requests received.

11. The system of claim 10, wherein the processor-executable instructions that causes the computing nodes to issue the plurality of cryptographic voting tokens to each of the plurality of voters comprises instructions that causes each of the computing nodes to:
- receive a distributed ledger registration request from a first potential voter to participate in the voting contest, the distributed ledger registration request comprising a cryptographically-signed public digital address of a cryptographic wallet associated with the first potential voter;
- validate the distributed ledger registration request; and
- after validating the distributed ledger registration request, issue a first cryptographic voting token from a first public digital address of a first cryptographic wallet associated with the smart voting contract to a second public digital address associated with a second cryptographic wallet associated with the first potential voter.

12. The system of claim 11, wherein the processor-executable instructions of each of the plurality of computing nodes further comprises instructions that causes each of the computing nodes to:
- receive a second distributed ledger registration request for the first potential voter to participate in the voting contest;
- determine that the first potential voter already received a first cryptographic voting token associated with the voting contest; and
- after determining that the first potential voter already received the first cryptographic voting token associated with the upcoming registration request, refrain, by the plurality of computing nodes, to issue a second cryptographic voting token to the digital address of the cryptographic wallet associated with the first potential voter.

13. The system of claim 10, wherein the processor-executable instructions of each of the plurality of computing nodes further comprises instructions that causes each of the computing nodes to:
- verify each of the voting transaction requests;
- generate a verified voting transaction for each of the voting transaction requests that were verified, each of the verified voting transactions comprising a distributed ledger-based transaction that memorializes each of the candidate selections from each of the voters, respectively; and generate a new cryptographic block when one or more verified voting transactions have been validated by each of the computing nodes, the new cryptographic block comprising the one or more verified voting transactions.

14. The system of claim 13, wherein the distributed ledger comprises a private sidechain, and the processor-executable instructions of each of the plurality of computing nodes further comprises instructions that causes each of the computing nodes to:

create cryptographic blocks during the voting contest, each of the cryptographic blocks unavailable for public viewing;

determine that the voting contest has concluded; and upon determining that the voting contest has concluded, provide at least some of the cryptographic blocks to a public distributed ledger, making the cryptographic blocks publicly available.

15. The system of claim 10, wherein the processor-executable instructions that causes the computing nodes to issue the plurality of cryptographic voting tokens to each of the plurality of voters comprises instructions that causes each of the computing nodes to:

receive a plurality of distributed ledger registration requests from the plurality of voters;

independently verify each of the distributed ledger registration requests;

generate a single cryptographic voting token each time that one of the distributed ledger registration requests is verified; and issue the single cryptographic voting token to a particular voter associated with a particular distrusted ledger registration request independently verified by each of the computing nodes.

16. The system of claim 10, wherein the processor-executable instructions of each of the plurality of computing nodes further comprises instructions that causes each of the computing nodes to:

receive a first voting transaction request;

determine that the voting contest has concluded; and ignore the first voting transaction request when the voting contest has concluded.

17. The system of claim 10, wherein each of the plurality of voting transaction requests comprises a cryptographic wallet address associated with one of the one or more candidates associated with the voting contest, and the processor-executable instructions that causes the computing nodes to determine a final result of the voting contest comprises instructions that causes each of the computing nodes to:

verify each of the voting transaction requests;

generate a verified voting transaction for each of the voting transaction requests that were verified;

validate each of the verified voting transactions;

determine that the voting contest has concluded;

determine a cumulative number of verified and validated voting transactions in each of the cryptographic wallets associated with each of the candidates, respectively; and determine a winner of the voting contest based on the cumulative number of verified and validated voting transactions in each of the cryptographic wallets.

18. The system of claim 10, wherein the processor-executable instructions of each of the plurality of computing nodes further comprises instructions that causes each of the computing nodes to:

create two or more cryptographic wallets, each of the two or more cryptographic wallets associated with a particular one of the candidates associated with the voting contest; and provide a public digital address associated with each of the two or more cryptographic wallets to each of the plurality of voters, respectively;

wherein each of the plurality of voting transaction requests comprise an identification of one of the two or more cryptographic wallets associated with one of the candidates selected by each of the plurality of voters, respectively.

* * * * *